Aug. 25, 1942.  W. J. RABE  2,293,919
INSECTICIDE HOLDER
Filed Sept. 8, 1941
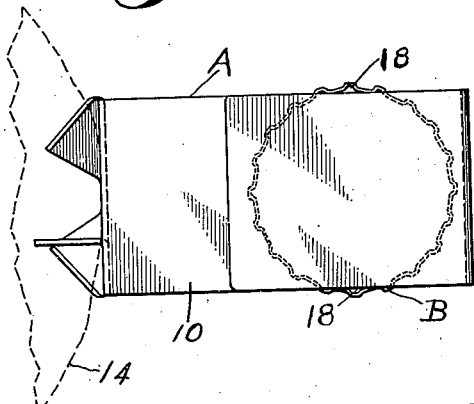
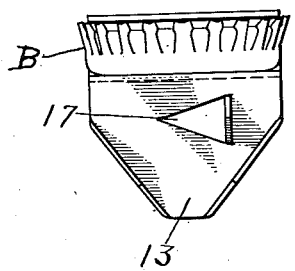
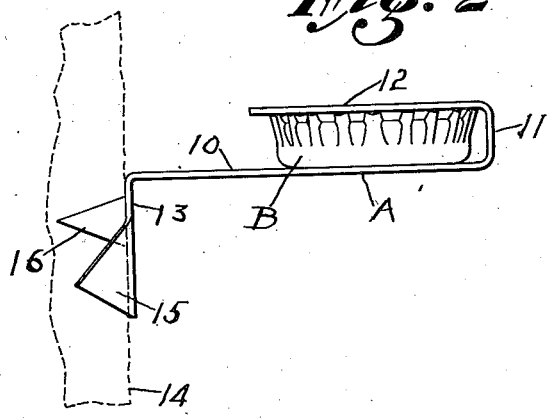
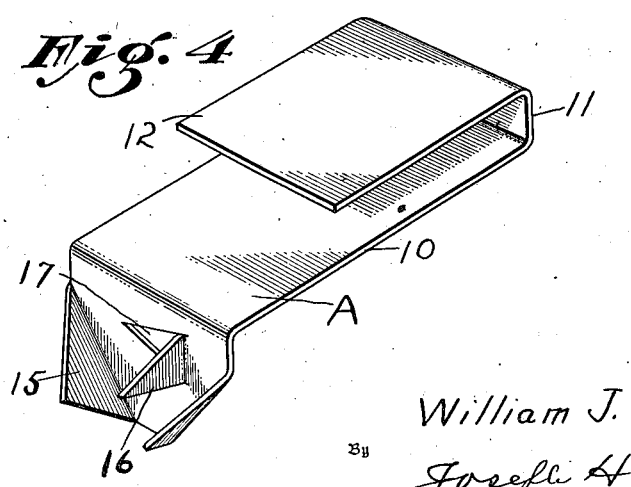
Inventor
William J. Rabe
By Joseph Harris
Attorney Patented Aug. 25, 1942

2,293,919

UNITED STATES PATENT OFFICE 2,293,919

INSECTICIDE HOLDER

William John Rabe, Redlands, Calif.

Application September 8, 1941, Serial No. 410,036

2 Claims. (Cl. 43—131)

This invention relates to improvements in insecticide holder and, more especially but not exclusively, a holder for ant poison and which is particularly adapted to be secured to trees, building walls and the like frequented by ants.

One object of the invention is the provision of a holder or device of the general character indicated which can be mounted in place with a minimum of effort and skill and the insecticide holder proper easily filled or replaced in a few seconds of time.

Another object of the invention is to provide an insecticide holder which can be manufactured at extremely low cost so as to permit of its economical use in large quantities, particularly in groves or orchards where control of pests is essential.

A further object of the invention is to provide an insecticide holder which, when in place, will have the insecticide so shielded as to be practically inaccessible to birds or animals and also protected against rain or the like which might otherwise foul or destroy the effectiveness of the insecticide.

Other objects of the invention will more clearly appear from the description hereinafter following taken in connection with the drawing in which:

Figure 1 is a top plan view of the improved insecticide holder showing the same in operative position as applied to a tree. Figure 2 is a side elevation of the holder shown in Figure 1. Figure 3 is an end elevation of the holder, and Figure 4 is a perspective of the bracket.

In said drawing, the insecticide holder, as an entirety, comprises, broadly, a bracket A and an insecticide container B.

The bracket, as shown, preferably consists of sheet metal adapted to withstand the elements, such as galvanized iron, and is formed or stamped so as to provide, when in operative position, a main horizontally disposed shelf or ledge 10 with one end of the strip of metal bent first upwardly as indicated at 11 and thence horizontally back over the main section 10 and parallel thereto as indicated at 12. At its other end, the strip of metal is bent downwardly at right angles as indicated at 13 and has preferably integrally formed therewith means for attaching the bracket to a tree, indicated in dotted lines at 14 or other supporting structures such as a wall of a house. Said means, as shown, preferably consists of bent prongs 15—15 disposed diagonally as indicated and/or a third prong stamped out from the sheet metal as indicated at 16, the prong 16 extending vertically when the bracket is in operative position. When the bracket is attached to a tree of reasonably large diameter or to the wall of a house, the prongs 15—15 will be effective by simply hammering the same into the supporting structure but, in the case of small diameter or young trees where the prongs 15—15 might not be effective, the vertical prong 16 will be sufficient to retain the bracket in place. In certain instances it may also be desirable to employ a small nail or tack in which event the same may be passed through the opening 17 left by stamping out the prong 16. As will be understood, the bracket is attached simply by the use of a hammer or like striking tool and obviously can be applied with a minimum of effort and skill.

The insecticide container proper B may be of any suitable form or material but, preferably, in order to minimize cost, consists of well known metal bottle caps such as may be acquired practically without any expense by utilizing used or discarded bottle caps, as will be understood. Whether bottle caps are employed or not, the container B should be of shallow dish-like form with an open top and of such vertical dimension that it may be slipped laterally between the main and overhanging spaced sections 10—12 of the bracket so that it will be frictionally held in place due to the inherent resiliency of the metal comprising the bracket A. Further, the relative width of the metal comprising the bracket A and the dimension of the container B transversely of the bracket A are made such that, when the container B is in operative position one or two diametrically disposed edges thereof will project slightly beyond the edges of the section 12 of the bracket, as indicated at 18—18 to thereby provide means of ingress for the ants or other insects while at the same time it will be obvious that the overhanging section 12 of the bracket provides a shield or cover to prevent birds or animals from obtaining access to the poison or insecticide disposed within the container B. It will also be obvious that the section 12 of the bracket serves as an efficient protection against rain or the like which might otherwise enter the container B and thereby foul or dilute and render ineffective the insecticide within the container B.

As will be apparent, the container B may be charged with the insecticide initially either by filling the same before the container is slipped into position on the bracket or after it is in position merely by shifting the container laterally sufficiently to expose a sufficient portion of the open top to permit filling as from an oil can or the like and then shifting the container back to the position shown in the drawing. The container B may be easily refilled at any time simply by shifting it laterally sufficiently to expose a large enough opening for filling as will be apparent.

By employing used or discarded bottle caps it is evident that the cost to the user is reduced to an absolute minimum and should the container become fouled it may be thrown away and a new one inserted in its place all practically without expense. It will further be evident that the bracket A is of such simple character that it may be manufactured at exceedingly low cost, thus permitting of the use of the insecticide holder in large quantities at practically nominal cost. Although the bracket A is shown with the overhanging section 12 above the main section 10, it will be obvious that the bracket could be applied in a position upside down to that shown in the drawing and the container B inserted in the upstanding position now shown in which event the section 10 of the bracket, if of the same width as the section 12 as shown, would function likewise as a cover or shield for the container thus, in effect, rendering the bracket reversible.

Although there has herein been shown and described what is now considered the preferred manner of carrying out the invention, the same is merely illustrative and not by way of limitation, all changes and modifications being contemplated that come within the scope of the claims appended hereto.

What is claimed is:

1. An insecticide holder comprising, in combination: a supporting bracket of inherent resilient material having integrally formed upper and lower substantially parallel spaced sections of unequal length and disposed substantially horizontally in operative position, the longer of said sections having an extension at approximately right angles thereto and by which the bracket may be attached to an upright support such as a tree or wall; and a relatively shollow insecticide container proper having open top for filling and refilling, said container being of such depth between its top and bottom engaging portions thereof that it is horizontally insertable and removable between said sections of the bracket when the latter is in said operative position and is frictionally resiliently held by and between said sections, the upper of said sections overlying said container being of an area and contour to permit access of ants to the open top of the container and at the same time to provide a protecting cover and guard for the opening of the container against rain and birds and whereby said container may, by partial horizontal shift, be filled or refilled while positioned between said sections and while the bracket is attached to its support in operative position.

2. An insecticide holder according to claim 1 wherein said bracket is provided with an integrally formed prong adapted to be driven into the supporting structure and said container proper is in the form of a shallow flat metal bottle cap.

WILLIAM JOHN RABE.